United States Patent [19]

Jones et al.

[11] Patent Number: 4,461,637
[45] Date of Patent: Jul. 24, 1984

[54] CONTROL OF GLASSWARE FORMING MACHINE

[75] Inventors: Stanley P. Jones, Tickhill; Derek Gennard, Maltby; Frank A. Fenton, Wheatley, all of England

[73] Assignee: Emhart Industries, Inc., Farmington, Conn.

[21] Appl. No.: 433,115

[22] PCT Filed: Feb. 22, 1982

[86] PCT No.: PCT/GB82/00056
§ 371 Date: Sep. 30, 1982
§ 102(e) Date: Sep. 30, 1982

[87] PCT Pub. No.: WO82/02876
PCT Pub. Date: Sep. 2, 1982

[30] Foreign Application Priority Data

Feb. 27, 1981 [GB] United Kingdom ............. 8106201

[51] Int. Cl.³ ................................................ C03B 9/40
[52] U.S. Cl. ................................. 65/158; 65/29; 65/163; 65/DIG. 13; 364/473; 364/476
[58] Field of Search ............... 65/158, 159, 29, 163, 65/164, 250; 364/473, 476

[56] References Cited

U.S. PATENT DOCUMENTS

| | | | |
|---|---|---|---|
| 1,826,019 | 10/1931 | Peiler | 9/146 |
| 1,911,119 | 5/1933 | Ingle | 5/310 |
| 3,445,218 | 5/1969 | Trudeau | 65/235 |
| 4,203,752 | 5/1980 | Becker et al. | 65/163 |
| 4,266,961 | 5/1981 | Wood | 364/476 X |
| 4,313,750 | 2/1982 | Lulejian et al. | 65/160 |
| 4,367,087 | 1/1983 | Cardenas-Franco et al. | 65/163 |

FOREIGN PATENT DOCUMENTS

| | | |
|---|---|---|
| 2522603 | 4/1979 | France . |
| 1599801 | 4/1978 | United Kingdom . |
| 1599802 | 4/1978 | United Kingdom . |
| 1599803 | 4/1978 | United Kingdom . |

Primary Examiner—Arthur D. Kellogg
Attorney, Agent, or Firm—Gene Warzecha

[57] ABSTRACT

An individual section glassware forming machine comprises generating means (29) for generating an electrical command signal which is used to control transfer means (2) of the machine. The transfer means (2) is used for transferring a parison (P) from a blank station (A) at which the parison is formed in an inverted position and presenting the parison (P) in an upright position at another station (B). The magnitude of the electrical command signal varies in accordance with the desired position against time curve for the movement of the parison (P) and is used to operate an electrical or hydraulic servo-mechanism (32; 42) for controlling the movement of the transfer means (2).

11 Claims, 7 Drawing Figures

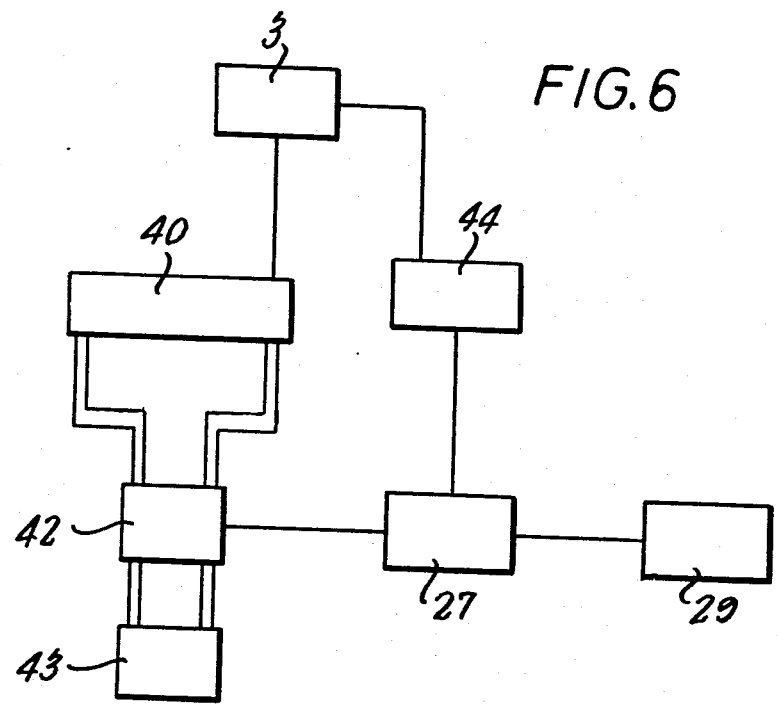

CONTROL OF GLASSWARE FORMING MACHINE

TECHNICAL FIELD

This invention is concerned with an individual section glassware forming machine comprising a blank station including a blank mould for forming a parison in an inverted position, and transfer means driven by a motor for transferring a parison from the blank station and presenting the parison in an upright position at another station.

BACKGROUND ART

In the manufacture of glassware by the conventional process using a conventional individual section glassware forming machine, a gob of molten glass is first formed into a parison either by pressing or blowing in a blank or parison-forming mould at a blank station of the machine. The parison is formed in an inverted position at the blank station, and is transferred directly to a shaping station where the parison is presented in an upright position ready for final shaping of the article of glassware by the application of air under pressure inside the parison in a blow mould at the shaping station. The parison is thus inverted through 180° during transfer from the blank station to the shaping station.

During this transfer the parison is held by its finish in the neck rings of a pneumatically driven inverting mechanism and, as the parison is moved through 180°, the parison passes through a range of positions in which the gravitational and centrifugal forces are acting to bend the parison about its finish. There is, therefore, a serious risk of damage to the finish as well as to the parison itself, and it is important to control the movement of the inverting mechanism in such a way as to minimise the deformation forces which are acting upon the parison and its finish during the inverting movement.

Damage to the parison and its finish can also arise from the impact forces generated when the arm of the inverting mechanism which carries the neck rings is brought to rest at the end of the stroke of the pneumatic piston and cylinder device which the drives the inverting mechanism. These impact forces act on the parison and its finish when the parison is in a vertical position, thereby presenting a different problem of damage which is additional to that which arises during the inverting movement.

Exactly similar problems arise in a three station individual section machine in which the parison is formed in an inverted position at the blank station and is transferred with an inverted movement from the blank station to an intermediate station where the parison is presented in an upright position for reheating before subsequent transfer of the parison from the intermediate station to a shaping station, which is the third station of the machine.

DISCLOSURE OF INVENTION

In an individual section glassware forming machine according to the invention, the machine comprises generating means for generating an electrical command signal the magnitude of which varies in accordance with the desired position against time curve for the movement of a parison from the blank station to the said other station, and an electrical or hydraulic servo-mechanism operated by said electrical command signal for controlling the movement of the transfer means.

By the use of the present invention, a parison may be moved in an inverting movement in which it is accelerated from the rest position at which it was formed at the blank station and decelerated to rest at the other station in accordance with any desired acceleration against time curve (within the physical limitations of the machine) by the generation of an appropriate command signal.

The acceleration against time curve may be selected so that the gravitational and centrifugal forces acting on the parison are substantially matched throughout the portion of the rotational inverting movement during which the parison is brought from the inverted position to a horizontal position, and the parison is decelerated relatively smoothly to rest in the said other station. In this way, the risk of damage to the parison and particularly to its finish during the inverting movement may be minimised.

A machine in accordance with the invention has the further advantage that the motion of the transfer means may be readily changed when the mechanism is to be used for inverting a parison of a different size and weight of glass. There is no necessity when using the present invention to change any of the mechanical parts employed in the transfer from the blank station to the other station when adapting the machine for making different glassware.

In order to ensure that the movement of the parison closely follows the desired position against time curve, the machine comprises position indicating means operable to provide an electrical position signal representative of the actual position of the transfer means, and difference means operable to compare the position signal with the command signal and to derive from this comparison an error signal which is used to operate the servo-mechanism.

In order to minimise the risk of damage to the machine, the machine comprises emergency action means operable to compare the position signal with a command signal and initiate emergency action if the position signal deviates from the command signal by more than a predetermined tolerance. Furthermore, the emergency action means is operable, on starting the machine, to compare the position signal with a signal corresponding to the transfer means being within a predetermined distance from its rest position at the blank station, and to initiate emergency action if the transfer means is not within this distance on starting of the machine. This arrangement avoids the difficulty that the transfer means may travel rapidly back to the blank station causing damage.

In order to improve the operation of the servo-mechanism, the machine comprises a tachometer which is driven by the motor and provides velocity feedback to the servo-mechanism. In order to further minimise the risk of damage to the machine, the machine comprises emergency action means operable to take emergency action if the rotational speed of the motor detected by the tachometer exceeds a predetermined maximum.

Preferably the motor drives a worm meshing with a gear wheel attached to and rotatable with a neck ring arm carrying at least one neck ring for holding a parison, the neck ring arm being rotated by the motor through 180°.

Advantageously, the generated electrical command signal varies with time in such a manner that the accelerating part of the inverting movement approximates to a simple harmonic motion, and the decelerating part of the inverting movement is modified from simple harmonic motion to give a smooth deceleration of the parison to a rest position at the said other station.

Preferably, the parison is moved from the blank station to the said other station in a motion in which the period of acceleration from rest at the blank station is not shorter than the period of deceleration to rest at the other station. The transition between acceleration and deceleration in the movement of the parison may occur at a time within a range of 0.5 to 0.7 of the total time of transfer of the parison, the range 0.5 to 0.6 being appropriate for small parisons while the range between 0.6 and 0.7 is appropriate for large parisons.

BRIEF DESCRIPTION OF DRAWINGS

In the accompanying drawings

FIG. 6 is block diagram of a hydraulic servo-mechanism which is an alternative to the perferred electrical servo-mechanism shown in FIG. 3.

BEST MODE OF CARRYING OUT THE INVENTION

Figure 1:
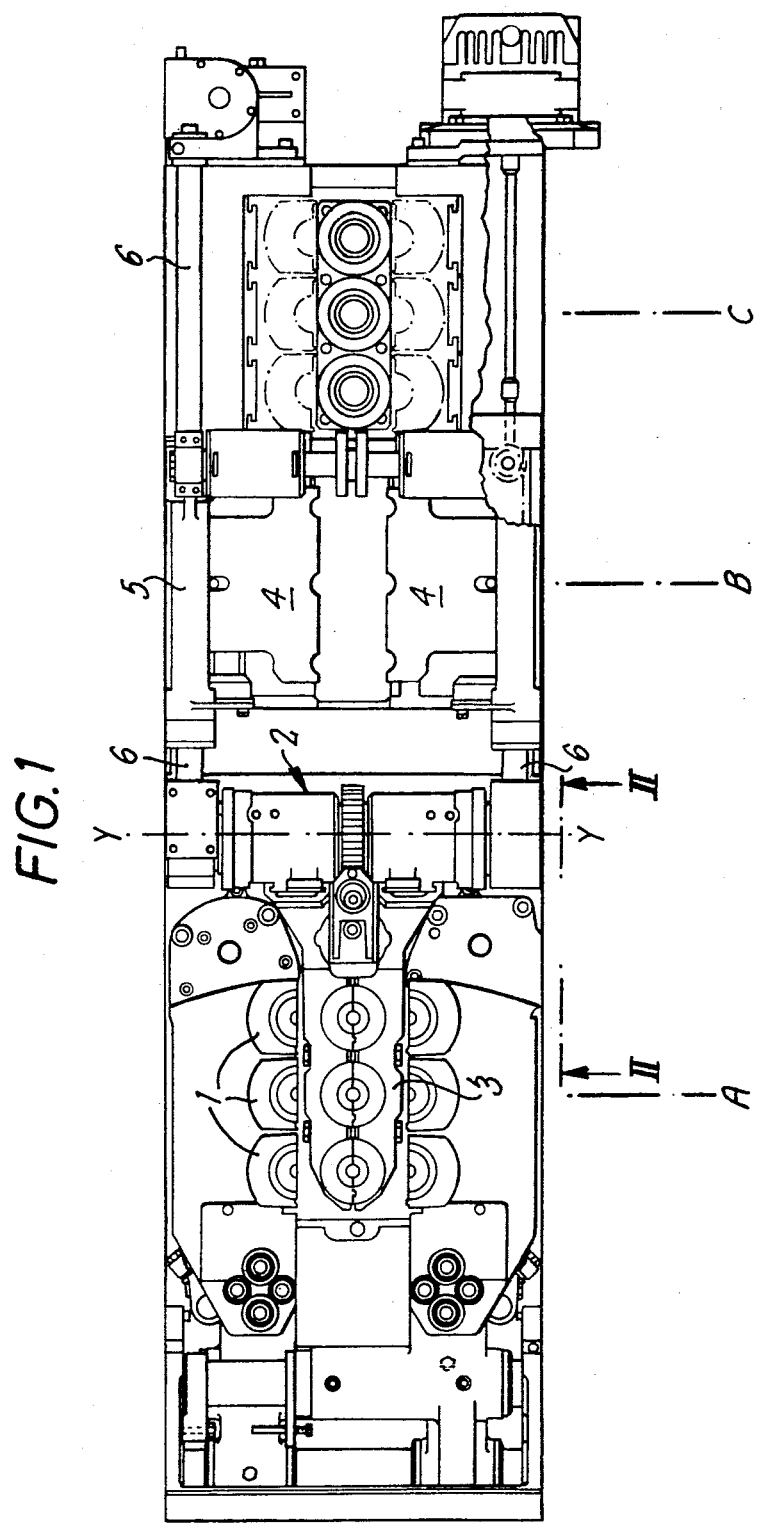
FIG. 1 is a diagrammatic plan view of a glassware forming machine in accordance with the invention with parts omitted for clarity.

The glassware forming machine shown in FIG. 1 is a triple gob three station individual section machine. Gobs of molten glass are fed to three blank moulds 1, (shown open in FIG. 1) at a blank station A where gobs are formed into parisons in an inverted position. A transfer and invert mechanism 2 moves the three parisons formed at the blank station A to an intermediate station B where reheating of the parisons takes place. The mechanism 2 is rotatable about a transverse horizontal axis y-y, a neck ring arm 3 of the mechanism 2 swinging through 180° to transfer the parisons from the station A to the station B in a conventional manner. At the intermediate station B, the parisons are received in an upright position by support jaws 4 of a transfer carriage 5 horizontally movable along spaced guide rails 6 between the intermediate station B and a shaping station C of the machine. The parisons are formed into articles of glassware at the shaping station C, being removed from the shaping station C by take-out means (not shown).

Figure 2:
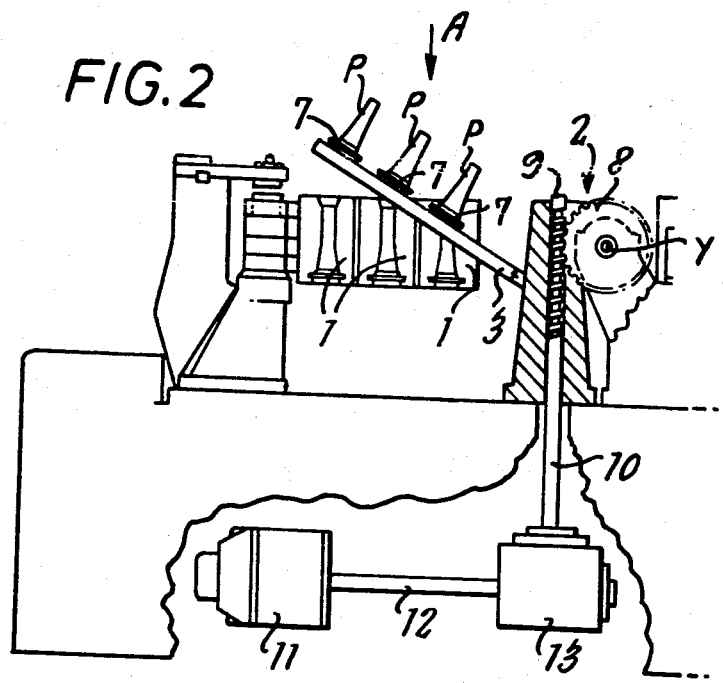
FIG. 2 is a side view of part of the machine of FIG. 1 looking in the direction of II—II of FIG. 1 with parts removed to disclose the blank moulds and the transfer and invert mechanism thereof.

Referring to FIG. 2, the neck ring arm 3 of the transfer and invert mechanism carries three neck rings 7 which hold parisons P as they are moved from the inverted position in which they are formed at the station A to an upright position at the station B. The transfer and invert mechanism 2 includes an actuating means having a gear 8 rotatable about the axis y to rotate the neck ring arm 3. The gear 8 engages with a worm 9 secured at one end of a vertical drive shaft 10 driven by an electrical motor 11 through a horizontal drive shaft 12 and a gearbox 13 which has meshing bevelled gears which turn the direction of drive through 90° from the horizontal shaft 12 to the vertical shaft 10.

Figure 3:
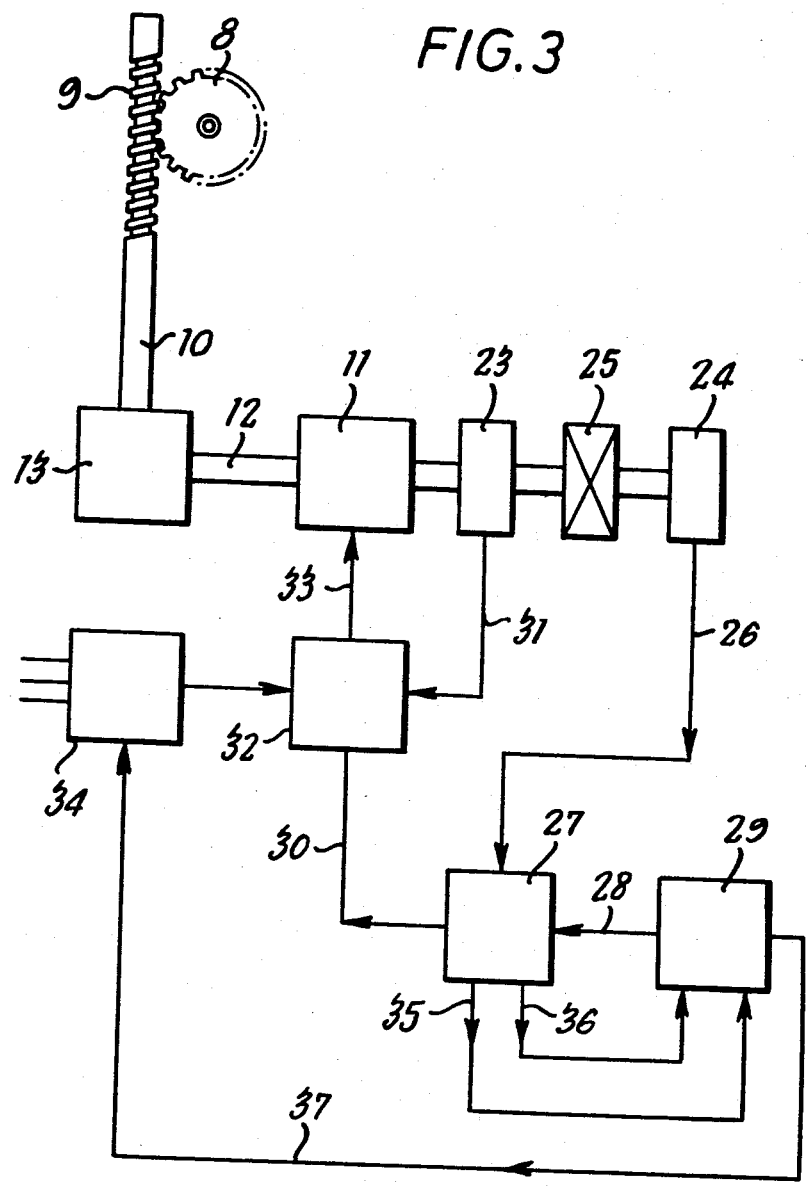
FIG. 3 is a block circuit diagram of an electrical servo-mechanism for driving the transfer and invert mechanism of the machine of FIGS. 1 and 2.

The motor 11 drives the transfer and invert mechanism 2 under servo or feedback control. This control is provided by an electrical servo-mechanism illustrated in block circuit form in FIG. 3 which also shows diagrammatically the shafts 10 and 12, the gearbox 13, the worm 9 and the gear 8. As shown in FIG. 3, the motor 11 drives a tachometer 23 and a single turn potentiometer 24 through a reduction gearbox 25. As an alternative, a multi-turn potentiometer could be used and the reduction gearbox 25 omitted. The output of a potentiometer 24 is an electrical signal (within the range 0 to 10 volts) proportional to the displacement of the motor shaft 12 from a datum position, and this position signal is fed by a lead 26 to an input module board 27. The input module board 27 receives by way of a lead 28 an electrical command signal from a computer 29. The computer 29 provides generating means for generating the electrical command signal and the magnitude of this signal varies in accordance with a desired position against time curve for the movement of a parison P from the blank station A to the intermediate station B. Within the input module board 27 there is a differential amplifier which provides an electrical signal representative of the difference between the command signal from the computer 29 and the position signal from the potentiometer 24. The resulting difference, which may be termed the error signal, is fed on a lead 30 to a servo-drive means 32 which may employ thyristors or rely on pulse width modulation. The servo-drive means 32 produces a DC current which is representative of the error signal and which is applied by a lead 33 to the motor 11 to drive the latter. Power for the servo-drive means 32 is provided by a transformer 34. The servo-drive means 32 has over voltage and over current protection. The potentiometer 24 thus provides position indicating means operable to provide an electrical position signal representative of the actual position of the transfer and invert mechanism 2, and the input module board 27 provides difference means operable to compare the position signal with the command signal and to derive from this comparison an error signal which is used to operate the servo-drive means 32.

The tachometer 23 produces a signal representative of the speed of the motor 11, and this signal is fed by a lead 31 to the servo-drive means 32 so that the servo-drive means 32 is provided with velocity feedback. If the signal on the lead 31 indicates that the motor 11 is rotating in excess of a predetermined maximum speed, this condition is sensed and emergency action is initiated, which may comprise a production of a visible warning signal to the operator and disconnection of power to the motor 11. As an alternative to disconnecting power to the motor 11, the speed of the latter may be limited to prevent a further increase in speed above the predetermined maximum speed.

The tachometer 23 provides velocity feedback which improves the servo loop stability and gain, and renders the system immune to varying frictional effects which can result from bearing tightening or loosening. The provision of velocity feedback enables faster transfer speeds to be obtained.

As a result of the feedback action provided by the circuit of FIG. 3, rotation of the output shaft of the motor 11 follows or "tracks" the movement commanded by the computer 29. In consequence, the graph depicting displacement of the neck ring arm 3 against time can be made to conform with any desired profile which is fed into the computer 29. This facility exists for both the operative stroke of the neck ring arm 3 (when the latter carries parisons from the blank station A to the intermediate station B) and for the return stroke of the neck ring arm 3, within the physical limitations of the system of movable parts. However, it is the movement of the neck ring arm 3 from the station A to the station B which is important because this is when the neck ring arm 3 carries parisons. The return movement of the neck ring arm 3 from the station B to the station A, when the neck ring arm 3 is not carrying parisons, can be accomplished in the quickest manner possible.

Figure 4A:
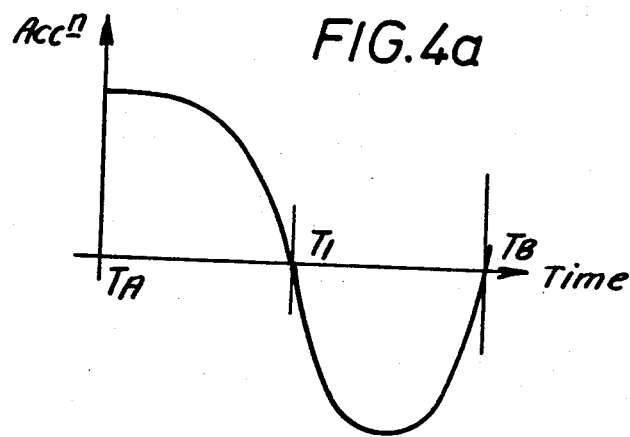
FIGS. 4a and 4b are graphs showing two possible variations of neck ring arm acceleration with time.
Figure 4B:
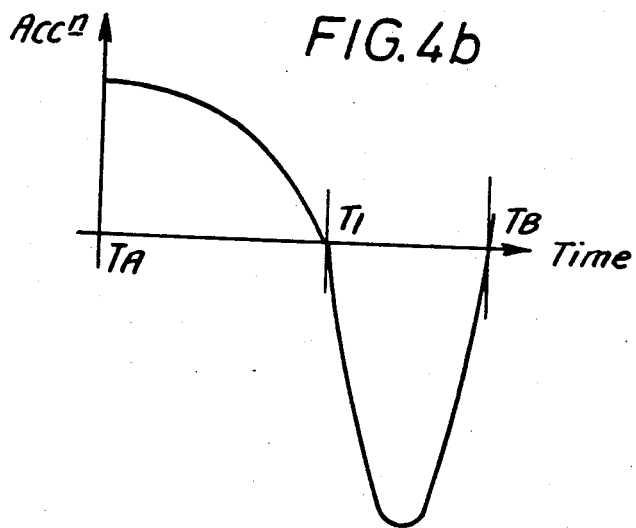

FIGS. 4a and 4b show two possible variations of neck ring arm acceleration against time as commanded by the computer 29, in each Figure the acceleration being plotted from time $T_A$ (when the neck ring arm 3 is at the station A, to time $T_B$ (when the neck ring arm 3 is at the station B). Referring to FIG. 4a, the portion of the curve from $T_A$ to the time $T_1$ at which the curve crosses the time axis approximates to the first quarter of a cycle of a cosine curve, and the portion of the curve from time $T_1$ to time $T_B$ is a modification of the second half of a cycle of a sine curve. In FIG. 4a, the time $T_1$ is approximately halfway between time $T_A$ and time $T_B$, but it is preferred for the time from $T_A$ to $T_1$ to be not less than time from $T_1$ to $T_B$. For small parisons, it is advantageous for the time $T_1$ to lie between 0.5 and 0.6 of the time interval between $T_A$ and $T_B$, but for large parisons it is preferred for the time $T_1$ to lie between 0.6 and 0.7 of the time between $T_A$ and $T_B$.

The profile of FIG. 4b shows an alternative variation of acceleration with time suitable for larger parisons. Again the acceleration section of the curve from time $T_A$ to time $T_1$ can be regarded as approximating to the first quarter of a cosine curve, and the deceleration section of the curve from time $T_1$ to time $T_B$ as approximating to the second half of a sine curve. However the time $T_1$ at which the curve of FIG. 4b crosses the time axis is at approximately 0.7 of the time interval between time $T_A$ and time $T_B$.

On referring again to FIG. 3, the existence on the lead 26 of an electrical signal representative of the position of the neck ring arm 3 enables various checking functions to be performed, and two of these checking functions will now be described.

The first of the checking functions involves comparing the actual position signal from the potentiometer 24 with the command signal from the computer 29. This comparison is done by the input module board 27 and is maintained through each machine cycle. The input module board 27 acts as emergency action means operable to initiate emergency action if the position signal deviates from the command signal by more than a predetermined tolerance. During correct operation of the machine, when the actual position signal differs from the command signal by not more than a predetermined acceptable tolerance, such as 20 percent, the output signal is high on a lead 35 from the board 27. The signal on the lead 35 is sensed by the computer 29, and so long as this signal remains high the computer 29 produces an enable signal on a lead 37 to maintain power to the servo-drive means 32. If the actual position signal differs from the command signal by more than the predetermined acceptable tolerance, the output signal on the lead 35 goes low. The incidence of a low signal on the lead 35 generates in the computer 29 an interrupt signal which cancels the enable signal on the lead 37, thereby shutting off power to the servo-drive means 32. Hence, the power to the motor 11 is disconnected if the actual position of the neck ring arm 3 differs from the commanded position by too much.

Unlike the first checking function, the second checking function is carried out only when the machine is started or restarted, and the purpose of this second checking function is to ensure that the neck ring arm 3 is at or near the blank station A when the machine is started. This is a precaution against the neck ring arm travelling rapidly back to the station A when the machine is started. The input module board 27 acts as emergency action means, on starting the machine, to compare the position signal from the potentiometer 24 with a signal set into the board 27 which corresponds to the neck ring arm 3 being within a predetermined distance from its rest position at the blank station A and to initiate emergency action if the neck ring arm 3 is not within this distance on starting of the machine. This predetermined distance may for example be 10 percent of the total angular traverse of the neck ring arm. The second checking function is carried out by the board 27 to which is connected a lead 36. The signal on the lead 36 is high if the comparison indicates that the neck ring arm 3 is within the preset distance of the blank station A and the signal on the lead 36 is low if the comparison indicates that the neck ring arm 3 is outside the preset distance. A low signal on the lead 36 prevents the machine from being started.

Figure 5:
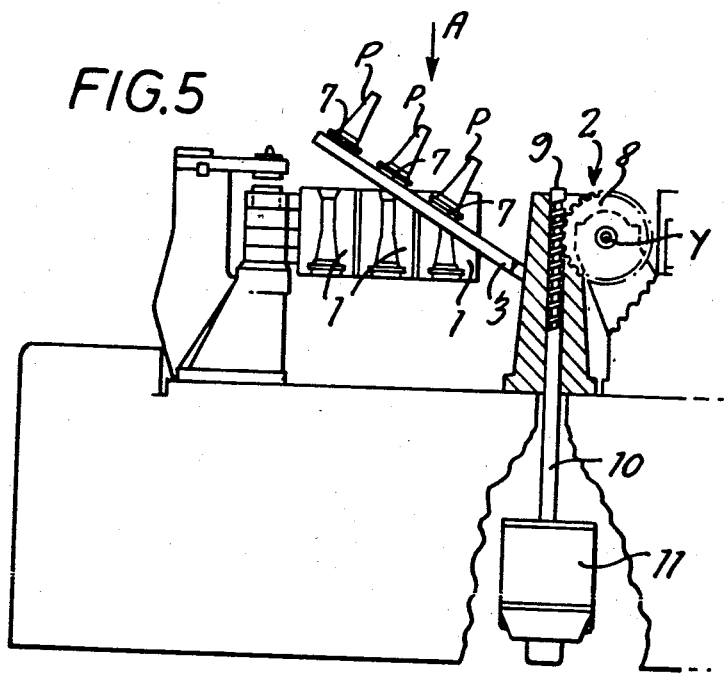
FIG. 5 is a side view similar to FIG. 2, of a perferred transfer and invert mechanism according to the invention.

In FIG. 5 of the accompanying drawings there is shown a preferred transfer and invert mechanism which is a modification of the mechanism shown in FIG. 2 in that the electrical motor 11 is arranged to drive the vertical shaft 10 directly rather than via horizontal drive shaft 12 and gearbox 13.

FIG. 6 is a block diagram of a hydraulic servo-mechanism which may be used as an alternative to the electrical servo-mechanism to drive the neck ring arm 3 of the machine. In the arrangement of FIG. 6, the neck ring arm 3 is driven by a hydraulic cylinder 40 to which hydraulic fluid is fed by a hydraulic servo valve 42 connected to a hydraulic pump 43. The position of the neck ring arm 3 is sensed by a transducer 44 (e.g. a potentiometer) which provides a position signal to the input module 27. The input module 27, in a manner similar to that described in relation to FIG. 3, receives from a computer 29 a command signal representing the desired variations of carriage position with time. The input module 27 derives an electrical error signal representing the difference between the position signal from the transducer 44 and the command signal from the computer 29, this error signal is fed to the servo valve 42 to control the latter so that movement of the neck ring arm 3 follows the desired variation of position with time.

The described embodiments shown in FIG. 3 and 6 utilise the potentiometer, but it will be appreciated that any precision transducer providing an electrical signal representative of the neck ring arm 3 position (or motor output shaft displacement) could be used to provide the position signal for the feedback loop. Further, the graphs of FIGS. 4a and 4b show two possible variations of acceleration with time but other variations are possible by feeding into the computer 29 the appropriate position against time curve giving rise to the desired variation of acceleration with time.

The facility of substituting different position against time curves makes it easier to change the motion of the neck ring arm 3, for example when changing the machine from producing one type of bottle to another, than is the case with known machines having mechanical transfer means.

By the use of a command signal generated from an acceleration against time curve in which the deceleration part of the curve approximates to the second half of a sine curve, damage to the parison and its finish due to impact forces as the parison is brought to rest at the end of the motion of the neck ring arm 3 may be substantially eliminated.

We claim:

1. An individual section glassware forming machine comprising a blank station including a blank mould for forming a parison in an inverted position, and transfer means driven by a motor for transferring a parison from the blank station and presenting the parison in an upright position at another station, characterised in that said motor is an electrical motor and in that the machine comprises generating means for generating an electrical command signal the magnitude of which varies in accordance with a desired position against time curve for the movement of a parison from the blank station to the said other station, and an electrical servo-mechanism operated by said electrical command signal said electric servo-mechanism operatively connected to said motor to control the movement of the transfer means.

2. A machine according to claim 1, characterised in that the machine comprises position indicating means (24) operable to provide an electrical position signal representative of the actual position of the transfer means (2), and difference means (27) operable to compare the position signal with a command signal and to derive from this comparison an error signal which is used to operate the servo-mechanism (32).

3. A machine according to claim 2, characterised in that the machine comprises emergency action means (27) operable to compare the position signal with the command signal and initiate emergency action if the position signal deviates from the command signal by more than a predetermined tolerance.

4. A machine according to claim 3, characterised in that the emergency action means (27) is operable, on starting the machine, to compare the position signal with a signal corresponding to the transfer means (2) being within a predetermined distance from its rest position at the blank station (A), and to initiate emergency action if the transfer means (2) is not within this distance on starting of the machine.

5. A machine according to claims 1 or 2 characterised in that the machine comprises a tachometer (23) which is driven by the motor (11) and provides velocity feedback to the servo-mechanism (32).

6. A machine according to claim 5, characterised in that the machine comprises emergency action means (32) operable to take emergency action if the rotational speed of the motor (11) detected by the tachometer (23) exceeds a predetermined maximum.

7. A machine according to claim 1 characterised in that the motor (11) drives a worm (9) meshing with a gearwheel (8) attached to and rotatable with a neck ring arm (3) of the transfer means (2), the arm (3) carrying at least one neck ring (7) for holding a parison (P), the neck ring arm (3) being rotated by the motor (11) through 180°.

8. A machine according to claim 1 characterised in that the generated electrical command signal varies with time in such a manner that the accelerating part of the inverting movement approximates to a simple harmonic motion, and the decelerating part of the inverting movement is modified from simple harmonic motion to give a smooth deceleration of the parison (P) to a rest position at the said other station (B).

9. A machine according to claim 1 characterised in that the parison (P) is moved from the blank station (A) to the said other station (B) in a motion in which the period of acceleration from rest at the blank station (A) is not shorter than the period of deceleration to rest at the other station (B).

10. A machine according to claim 1 characterised in that the generated electrical command signal varies such that the transition between acceleration and deceleration in the movement of the parison (P) from the blank station (A) to the other station (B) occurs at a time within a range of 0.5 to 0.7 of the total time of transfer of the parison (P) from the blank station (A) to the said other station (B).

11. An individual section glassware forming machine comprising at least two operating stations and transfer means driven by a motor for moving a parison from one station and presenting the parison in an upright position at another station, characterised in that said motor is an electric motor and in that the machine also comprises control means operatively connected to said motor for generating an electrical command signal for controlling said motor, said signal varying in accordance with a desired position against time curve for controlling the movement of said parison.

* * * * *